United States Patent Office 3,780,177
Patented Dec. 18, 1973

3,780,177
17-BUTYRATE, 21 - ESTER DERIVATIVES OF 6α,9α-DIFLUOROPREDNISOLONE, COMPOSITIONS AND USE
Alberto Ercoli, Milan, and Rinaldo Gardi, Carate Brianza, Milan, Italy, assignors to Warner-Lambert Company, Morris Plains, N.J.
No Drawing. Application June 30, 1970, Ser. No. 51,378, which is a continuation-in-part of applications Ser. No. 735,509 and Ser. No. 735,537, both June 10, 1968, all now abandoned. Divided and this application Nov. 10, 1971, Ser. No. 197,476
Claims priority, application Italy, June 6, 1967, 17,274/67, 17,277/67
Int. Cl. A61k 17/00; C07c 167/00
U.S. Cl. 424—243                                14 Claims

ABSTRACT OF THE DISCLOSURE

There have been prepared the new 17-butyrates, 21-esters of 6α,9α-difluoroprednisolone useful as anti-inflammatory agents. They may be mixed with suitable pharmaceutical carriers to obtain pharmaceutical compositions for the systemic and local treatment of inflammatory conditions and diseases.

---

This application is a division of application Ser. No. 51,378, filed June 30, 1970, now abandoned, wherein this application is a continuation-in-part of our applications Ser. Nos. 735,509 and 735,537, both filed June 10, 1968, both now abandoned.

The new compounds of this invention are 17-butyrate, 21-esters of 6α,9α-difluoroprednisolone represented by the following structural formula:

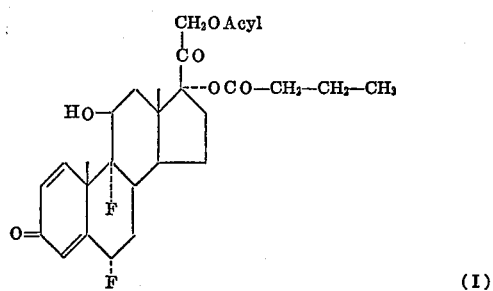

wherein Acyl is a lower alkanoic acid radical which may be acetyl, propionyl, butyryl or isobutyryl.

The invention also relates to pharmaceutical compositions containing these compounds as well as to those compositions particularly adapted for systemic and topical use in the treatment of inflammatory conditions and diseases.

6α,9α-difluoroprednisolone and 21-esters thereof are purported to be potent gluco-corticoids and are believed to be useful as anti-inflammatory agents. Unfortunately, their undesirable sodium retaining properties and their limited activity on topical application have limited their usefulness.

We have now found that the 17-butyrates 21-esters of 6α,9α-difluoroprednisolone possess the unusual property of being highly active as anti-inflammatory agents both for topical and systemic use, as it is evidenced by bioassays especially designed for measuring the topical and systemic activity of corticosteroids (e.g. vasoconstriction test, agar granuloma and granuloma pouch assays). 6α,9α-dofluoroprednisolone 17-butyrate,21-acetate, which is the preferred compound, shows also significant anti-edema properties when tested both subcutaneously and orally in the carrageenin induced rat paw edema assay. The re-markable activity of the specific compounds of this invention appears to result by the combination of a 17-butyrate with a 21-ester group as defined above in 6α,9α-difluoroprednisolone, thus providing potent anti-inflammatory steroids, particularly valuable for animal or human use.

The compositions of this invention comprise the 17-butyrate,21-esters of 6α,9α-difluoroprednisolone in combination with one or more non-toxic pharmaceutical carriers or bases. These therapeutically useful compositions can be used in several pharmaceutical forms according to the way of administration, e.g. parenterally, orally, rectally or topically. Thus, the active ingredients may be composed with the usual carriers for the preparation of conventional dosage forms, such as pills, tablets, syrups, aqueous suspensions or oily solutions or other forms particularly adapted for systemic use in corticosteroid therapy.

For topical application, which is the preferred route of administration, the active ingredients can be incorporated in the usual compatible vehicles utilized for the production of ointments, lotions, creams, emulsions, drops, sprays, suppositories, tablets or pellets and aerosols, as well known in the pharmaceutical art. Ointments may be formulated, for example, for both hydrophilic and hydrophobic applications and when lotions are formulated they may comprise aqueous or non-aqueous bases.

The pharmaceutical carriers which are suitable are those usually employed in pharmaceutical formulation techniques such as, for example, fats, vegetable oils, fatty acids, alcohols, poly-alkylene glycols, waxes, petrolatum, polyesters, etc. and may be combined with water and gelling agents when compatible.

The 17-butyrates,21-esters of 6α,9α-difluoroprednisolone are included in the compositions of this invention in an amount sufficient to produce the desired therapeutic effect upon the inflammatory process or condition. Advantageously, the compositions will contain the active ingredient in an amount of from 0.0005% to 5% by weight and, preferably, contain the specific active ingredient in an amount of from about 0.001 to about 0.25% by weight.

The compositions of this invention are useful for the systemic treatment of arthritis and related diseases and, when topically applied, they are useful for the treatment of dermatitis of various type, psoriasis, and other allergic conditions which respond to the topical application of anti-inflammatory steroids. These anti-inflammatory topical compositions are applied to the affected sites several times daily. Other substances, such as bacteriostatic agents, antibiotics, cosmetically desirable pigments, perfumes and local anesthetics may be also incorporated in these topical anti-inflammatory compositions if these added properties or characteristics are desired.

The compounds of this invention can be prepared starting from 6α,9α-difluoroprednisolone according to the following reaction sequence:

Scheme A

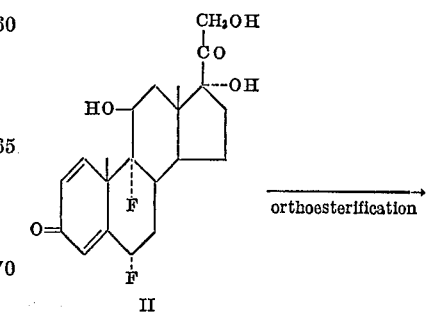

SCHEME A—Continued

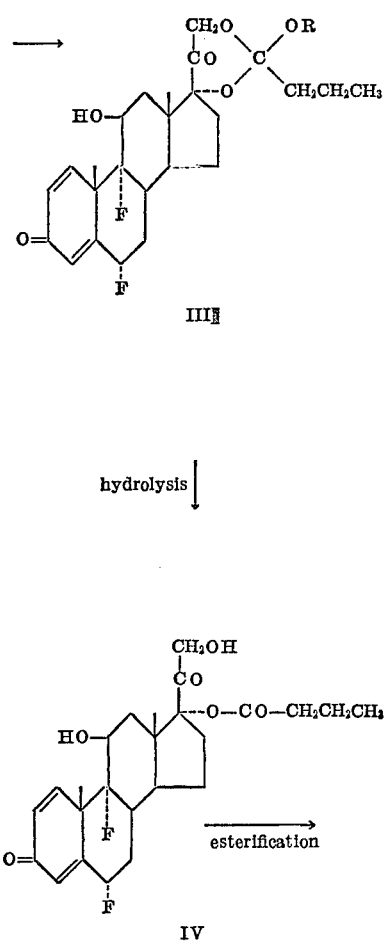

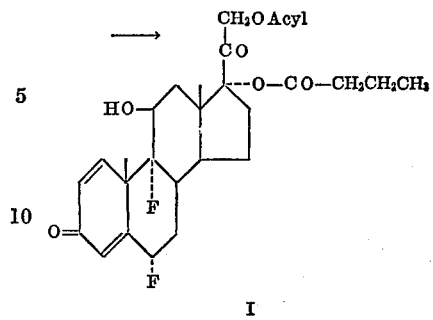

in which R is lower alkyl, preferably methyl or ethyl and Acyl has the meaning stated above. The process is accomplished by reacting 6α,9α-difluoroprednisolone with a lower alkyl orthobutyrate, preferably methyl orthobutyrate or ethyl orthobutyrate in an organic solvent and in the presence of an acid catalyst. The reaction is carried out at a temperature ranging from 60 to 130° C. and preferably around 100–110° C. for a period of 8–24 hours, whereby the 17α,21-orthobutyrate of Formula III forms as a mixture of two epimeric orthoesters. From the mixture a crystalline product can be isolated, whose physical properties depend on the percentage of the epimers. The orthobutyrate thus obtained is then hydrolyzed in an acidic medium according to the process described in Gazzetta Chimica Italiana, 1963, Vol. 93, pages 413–450, to give the 17-monobutyrate IV. This latter compound is then esterified at the 21-OH group by treatment with acetic, propionic, butyric or isobutyric anhydride in pyridine according to the usual known procedures.

The steps of this process can be carried out with or without isolating the epimeric 17α,21-orthoesters III or the 17-monoester IV.

Alternatively, the compounds of this invention can be prepared starting from $\Delta^{4,9(11)}$-pregnadiene-17α,21-diol-3,20-dione according to the following reaction sequence Scheme B

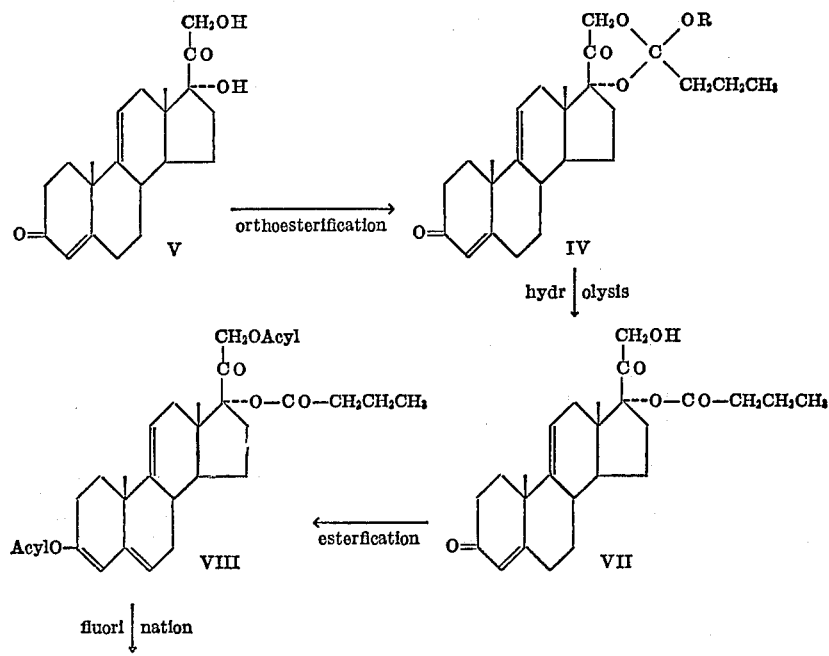

SCHEME B—Continued

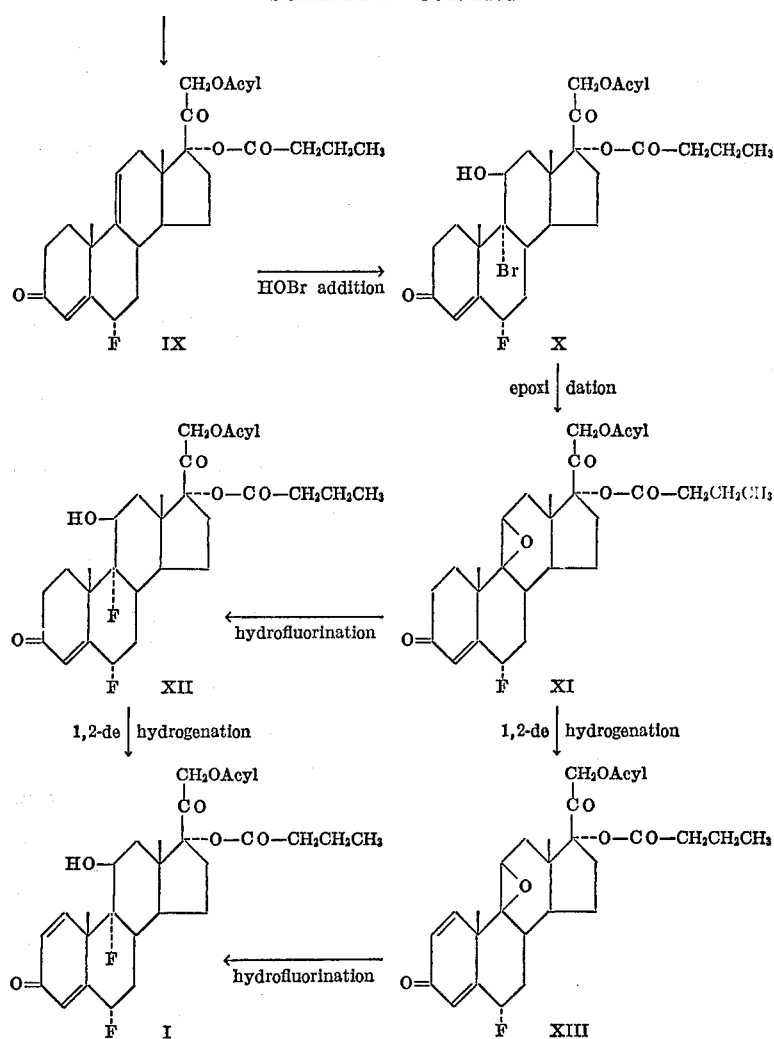

The above process identified as Scheme B is carried out by orthoesterification of the starting material V with a lower alkyl orthobutyrate such as methyl or ethyl orthobutyrate which results in a mixture of two epimeric orthoesters VI. These can be directly hydrolyzed to the corresponding 17-monobutyrate VII according to the procedure set forth above for scheme A in an organic solvent and in the presence of an acid catalyst, as described in U.S. Pat. 3,152,154. The 17-monoester thus obtained is then esterified by being reacted with acetic, propionic, butyric or isobutyric anhydride in the presence of an acid catalyst to give the triester VIII.

When the triester to be prepared is the 3,17,21-tributyrate, it is convenient to employ, instead of the above three steps procedure, the method of direct esterification of $\Delta^{4,9(11)}$-pregnadiene-17α,21-diol-3,20-dione (V) with butyric anhydride using strong acylating conditions to afford simultaneously esterification of both 17α- and 21-hydroxy groups and enol esterification of the 3-keto group.

The triester VIII is fluorinated at the 6-position by treatment with perchloryl fluoride and the reaction product, consisting of a mixture of 6β-fluoro-$\Delta^{4,9(11)}$-pregnadiene-17α,21-diol-3,20-dione 17,21-diester and of the corresponding epimeric 6α-fluoro compound, is converted, for example by acid treatment, into the 6α-fluoro-$\Delta^{4,9(11)}$-pregnadiene-17α,21-diol-3,20-dione 17,21-diester shown as Compound IX. Treatment of Compound IX with a source of hypobromous acid, for example with N-bromoacetamide in the presence of perchloric acid, gives the bromohydrin Compound X, from which the 6α-fluoro-9β,11β-oxido-$\Delta^4$-pregnene-17α,21-diol-3,20-dione 17,21-diester shown as Compound XI is obtained by epoxidation for example with potassium acetate.

On opening the epoxy ring with hydrogen fluoride there is then obtained the 6α,9α-difluorohydrocortisone 17,21-diester XII. The double bond in 1,2-position can be introduced into Compound XII by known chemical methods, for example by use of selenium dioxide or by use of dichloro-dicyanobenzoquinone.

Alternatively, the double bond can also be introduced before opening the oxido ring, to convert Compound XI, the 6α-fluoro-9β,11β-oxido - $\Delta^4$ - pregnene-17α,21-diol-3,20-dione 17,21-diester, into the corresponding 6α-fluoro-9β,11β-oxido-$\Delta^{1,4}$-pregnadiene - 17α,21-diol-3,20 - dione 17,21-diester. The latter, which is Compound XIII, can then be treated with hydrogen fluoride to give the desired 6α,9α-difluoroprednisolone 17,21-diester identified as Compound I.

The following experimental part illustrates in detail the compounds which constitute this invention, their antiinflammatory activity and the methods for their production as well as the pharmaceutical compositions containing these compounds for topical and systemic administration. However, the examples are not to be regarded as limiting the invention.

EXAMPLE 1 (SCHEME A)

Orthoesterification

A mixture of 1 g. of 6α,9α-difluoroprednisolone, 10 mg. of p-toluenesulphonic acid, 5 cc. of dimethylformamide and 3 cc. of methyl orthobutyrate is heated for 15 hours on an oil bath at 105° C. while a slow stream of nitrogen is passed through the mixture so that the methanol produced as a by-product of the reaction is distilled off. After addition of several drops of pyridine to neutralize the acid catalyst, the reaction mixture is evaporated under vacuum and there is obtained a solid residue which is taken up with methanol, and filtered. The product is recrystallized from a methylene chloride-methanol mixture to yield 682 mg. of 6α,9α-difluoroprednisolone 17α,21-methylorthobutyrate, also identified as 17α,21-(1'-methoxy)-n-butylidenedioxy - 6α,9α - difluoro-$\Delta^{1,4}$-pregnadiene-11β-ol-3,20-dione, M.P. 194–198° C. $[\alpha]_D^{22}=+58°$ (dioxane, c.=0.5%).

UV: $\lambda_{max}$ 237–238 mμ, $E_{1\,cm.}^{1\%}=330$ (ethanol)

IR: $\nu_{max}$ 3330, 1725, 1663, 1616(s), 1605, 1258, 1152, 1123, 1068 and 1028 cm.$^{-1}$ (Nujol).

Upon chromatography of the mother liquor on a column of alumina another 338 mg. of a crystalline mixture of the epimeric orthobutyrates are isolated.

Hydrolysis

A suspension of 1 g. of the 6α,9α-difluoroprednisolone 17α,21-methylorthobutyrate in 10 cc. of methanol is treated with 2 cc. of a 2 N aqueous solution of oxalic acid and heated on a water bath at 40–50° C. for about 5–10 minutes and, afterwards, the mixture is concentrated under vacuum. The residue is then shaken with water, the insoluble product is filtered off and then dried. The solid material is recrystallized from acetone-ether and 6α,9α-difluoroprednisolone 17-butyrate is obtained, M.P. 193–196° C., $[\alpha]_D^{22}=+6.5°$ (dioxane, c.=0.5%).

UV: $\lambda_{max}$ 237–238 mμ, $E_{1\,cm.}^{1\%}=334$ (ethanol)

Esterification

A solution of 500 mg. of 6α,9α-difluoroprednisolone 17-butyrate in 2.5 cc. of pyridine is treated with 1.25 cc. of acetic anhydride and the reaction mixture permitted to stand overnight at 0° C. The reaction mixture is then poured into ice water and the crystalline precipitate formed is filtered off and recrystallized from a methylene chloride-ether-petroleum ether mixture to yield 494 mg. of 6α,9α-difluoroprednisolone 17-butyrate, 21-acetate; M.P. 191–194° C., $[\alpha]_D^{22}=+31.7°$ (dioxane, c.=0.5%).

UV: $\lambda_{max}$ 237–238 mμ, $E_{1\,cm.}^{1\%}=320$ (ethanol)

In analogous manner, by treating 6α,9α-difluoroprednisolone 17-butyrate with propionic anhydride in pyridine 6α,9α-difluoroprednisolone 17-butyrate, 21-propionate is obtained, M.P. 198–201° C., $[\alpha]_D^{22}=+33°$ (dioxane, c.=0.5%). UV: $\lambda_{max}$ 237–238 mμ, $E_{1\,cm.}^{1\%}=322$ (ethanol)

By esterifying the 17-butyrate ester with butyric or isobutyric anhydride as above, there are obtained:

6α,9α-difluoro-prednisolone 17,21-dibutyrate, M.P. 208–211° C., $[\alpha]_D^{22}=32.5°$ (dioxane, c.=0.5%). UV: $\lambda_{max}$ 237–238 mμ, $E_{1\,cm.}^{1\%}=287$ (ethanol)

and 6α,9α - difluoro-prednisolone 17 - butyrate, 21-isobutyrate, M.P. 223–225° C., $[\alpha]_D^{22}=+33°$ (dioxane, c.=0.5%). UV: $\lambda_{max}$ 237–238 mμ, $E_{1\,cm.}^{1\%}=302$ (ethanol)

EXAMPLE 2 (SCHEME B)

Orthoesterification and hydrolysis

A mixture of 20 g. of $\Delta^{4,9(11)}$-pregnadiene-17α,21-diol-3,20-dione (prepared as described in J. Am. Chem. Soc. 79, 1130; 1957) 200 mg. of p-toluenesulphonic acid, 80 cc. of dimethylformamide and 30 cc. of methyl orthobutyrate is heated for 7–8 hours at 105° C. while a slow stream of nitrogen is passed through the mixture so that the methanol produced by the reaction is distilled off. After addition of 1 cc. of pyridine to neutralize the acid catalyst, the reaction mixture is concentrated under vacuum and the semi-solid residue, consisting of the epimeric mixture of 17α,21-orthobutyrates, is suspended in 200 cc. of methanol. This suspension is treated with 30 cc. of a 2 N aqueous solution of oxalic acid and heated on a water bath at 40–50° C. for a few minutes to effect hydrolysis of the orthoester.

Esterification

The mixture obtained is then concentrated under vacuum and the residue consisting of 17α-butyroxy-$\Delta^{4,9(11)}$-pregnadien-21-ol-3,20-dione is treated with 500 cc. of acetic anhydride and 2.4 g. of p-toluenesulphonic acid and the mixture maintained for 1 hour under nitrogen at 80° C. The acetylated product is then poured into icewater and the crystalline product obtained is filtered off, washed with water and recrytsallized from a methanol-methylene chloride mixture to give the 3,21-diacetoxy-17α-butyroxy-$\Delta^{3,5,9(11)}$-pregnatrien-20-one which is compound VIII.

Following the above procedure and substituting propionic anhydride for acetic anhydride there is obtained the corresponding 3,21 - dipropionoxy-17α-butyroxy-$\Delta^{3,5,9(11)}$-pregnatrien-20-one.

By using in this procedure butyric anhydride or isobutyric anhydride, the corresponding 3,17α,21-tributyroxy-$\Delta^{3,5,9(11)}$-pregnatrien-20-one, or the corresponding 3,21-isobutyroxy-17α-butyroxy-$\Delta^{3,5,9(11)}$-pregnatrien-20-one are obtained.

Fluorination 6 g. of the above 3,2,1-diacetoxy-17α-butyroxy-$\Delta^{3,5,7(11)}$-pregnatrien-20-one are dissolved in 330 cc. of dioxane containing 35% water, and perchloryl fluoride is bubbled into the solution for 1½ hours at room temperature to fluorinate at the 6-position. The excess of perchloryl fluoride is eliminated by passing a nitrogen stream through the mixture and the product formed is precipitated by addition of water, filtered off and then washed with water. A mixture of epimeric 6α and 6β fluoro derivatives is obtained which is converted to the 6α-fluoro compound by dissolving the mixture in acetic acid, saturating the solution with anhydrous hydrogen chloride and by letting the acid mixture stand overnight at room temperature.

Hypobromous acid addition and epoxidation

The above acid mixture is then poured into icewater and the product, consisting of 6α-fluoro-$\Delta^{4,9(11)}$-pregnadiene-17α,21-diol-3,20-dione 17-butyrate, 21-acetate (compound IX) is filtered off and dissolved in 60 cc. of anhydrous dioxane. To the solution thus obtained there are added 4.5 cc. of 0.46 N perchloric acid and then 2.1 g. of N-bromoacetamide. The mixture is stirred for two hours, then the excess of N-bromo-acetamide is destroyed by addition of 9 cc. of a 10% aqueous solution of sodium bisulphite. By pouring the mixture into icewater there is obtained a precipitate, consisting of 6α-fluoro-9α-bromohydrocortisone 17-butyrate, 21-acetate (Compound X) which, after drying, is dissolved in 80 cc. of acetone. To this solution there are then added 2 g. of anhydrous potassium acetate and the mixture is refluxed for 17-hours. The solvent is evaporated under vacuum and the residue is diluted with water to give 9β,11β-oxido-6α-fluoro-$\Delta^4$-pregnene-17α,21-diol-3,20-dione 17 - butyrate,21 - acetate (Compound XI).

Hydrofluorination and 1,2-dehydrogenation

A solution of 1 g. of the epoxy derivative thus obtained in 10 cc. of anhydrous chloroform is cooled at −50° C. and treated with a solution consisting of 5.2 cc. of tetrahydrofurane and 5 cc. of a solution of 2 parts of hydrogen fluoride in 1 part of tetrahydrofurane. The reaction mixture formed is maintained at −25° C. for 4 hours then poured into a mixture of 33 g. of anhydrous potassium carbonate, 120 cc. of icewater and 70 cc. of chloroform. The aqueous phase is extracted with chloroform and the organic layer is washed with water until neutrality. After separation of the wash water and evaporation of the solvent under vacuum, the residue is taken up with ether and the ether filtered off leaving a residue of 6α,9α-difluorohydrocortisone 17 - butyrate,21 - acetate (Compound XII).

A solution of 500 mg. of 6α,9α-difluorohydrocortisone 17-butyrate, 21-acetate and 350 mg. of 2,3-dichloro-5,6-dicyano-1,4-benzoquinone in 5 cc. of anhydrous dioxane is refluxed for 24 hours, then the solvent is eliminated under vacuum and the residue taken up with methylene chloride. The crystalline dichlorodicyanohydroquinone is eliminated by filtration and the solution is chromatographed on 10 g. of alumina. By elution with methylene chloride, the 6α,9α-difluoroprednisolone 17-butyrate,21-acetate is obtained, identical to the product described in Example 1.

Substitution of the corresponding 21-propionate compound in the procedure of this example gives the desired 6α,9α-difluoroprednisolone 17-butyrate,21-propionate.

The same procedure can be applied to the preparation of 17,21 - dibutyrate and 17 - butyrate 21 - isobutyrate of 6α,9α-difluoroprednisolone.

EXAMPLE 3

1,2-dehydrogenation and hydrofluorination

By treating the 9β,11β-oxido-6α-fluoro - $\Delta^4$ - pregnene-17α,21-diol - 3,20 - dione 17 - butyrate,21 - acetate (Compound XI) with dichlorodicyanobenzoquinone according to the procedure set forth above in Example 2, the corresponding 9β,11β - oxido-6α-fluoro-$\Delta^{1,4}$-pregnadiene-17α,21-diol-3,20-dione 17-butyrate,21-acetate is obtained (Compound XIII) and converted into 6α,9α-difluoroprednisolone 17-butyrate,21-acetate (Compound I) by treatment with hydrogen fluoride as described above in the hydrofluorination step of Example 2.

EXAMPLE 4

Biological assays

The topical anti-inflammatory activity of the 17,21-diesters of this invention was determined using the following biological assays:

(a) Vasoconstriction assay.—This method measures the degree of evident blanching caused by various dilutions of corticosteroids when applied to the human skin. The experimentation was carried out on 24 human volunteers using a modification of the McKenzie's original procedure as communicated by G. Falconi and G. L. Rossi on "Fourth International Congress on Pharmacology," July 14–18, 1969 in Basel, Switzerland.

17-butyrate 21-acetate and 17-butyrate 21-propionate of 6α,9α-difluoroprednisolone were submitted to this assay and compared with 17-butyrate 21-acetate of betamethasone and with betamethasone 17-valerate. The test steroids dissolved in alcohol were applied by paper-patches to the flexor surfaces of the forearms of each of 24 subjects. The patches were removed after 18 hours and the arms examined for vasoconstriction by three independent observers who scored from zero to three according to the blanching degree within each subject.

Table I indicates the score reached by each of the test steroids at serial dilutions in four experiments.

TABLE I

Vasoconstriction

| Assay No. | Dose, μg. | 6α,9α-difluoroprednisolone | | | | Betamethasone | | | |
| --- | --- | --- | --- | --- | --- | --- | --- | --- | --- |
| | | 17-butyrate 21-acetate | | 17-butyrate 21-propionate | | 17 valerate | | 17-butyrate 21-acetate | |
| | | Score | Percent | Score | Percent | Score | Percent | Score | Percent |
| 2272 | 0.02 | 80 | 41.7 | | | 36 | 18.7 | 64 | 33.3 |
| | 0.05 | 121 | 63.0 | | | 57 | 29.7 | 115 | 59.9 |
| | 0.125 | 161 | 83.8 | | | 121 | 63.0 | 147 | 76.5 |
| 2273 | 0.02 | 73 | 38.0 | 53 | 27.6 | 19 | 9.9 | | |
| | 0.05 | 134 | 69.8 | 129 | 67.2 | 79 | 41.4 | | |
| | 0.125 | 167 | 87.0 | 171 | 89.0 | 112 | 58.3 | | |
| 2281 | 0.02 | 86 | 44.8 | | | 53 | 27.6 | | |
| | 0.05 | 145 | 75.5 | | | 74 | 38.5 | | |
| | 0.125 | 169 | 880 | | | 121 | 63.0 | | |
| 2336 | 0.03 | | | 101 | 52.6 | | | | |
| | 0.06 | | | 141 | 73.4 | | | | |
| | 0.12 | | | 183 | 95.3 | | | | |

These results show that the compounds of this invention are more potent than the betamethasone analogs. The calculation of the relative potencies indicates that difluoroprednisolone 17-butyrate 21-acetate and 17-butyrate 21-propionate are from 2 to about 2.5 times more active than betamethasone 17-valerate. This compound is recognized as one of the most effective anti-inflammatory steroids for topical application.

(b) Granuloma pouch assay.—This test was performed according to the technique of Robert and Nezamis (Acta. Endocr. 25, 105; 1957), using adult rats (Sprague-Dawley) weighing about 150 g. The rats were injected subcutaneously with 25 ml. of sterile air under ether anesthesia, and croton oil (0.5 ml. of 1% solution in corn oil) was injected into the air sac. The test steroids dissolved in 0.2 ml. of sesame oil were administered once on day 5 directly into the cavity of the pouch. On day 9 the animals were sacrificed and the exudate was collected and measured, the volume of exudate being inversely proportional to the anti-inflammatory potency of the steroid.

TABLE II

Granuloma pouch (Assay No. 2911)

| Compound (0.2 ml./oil) | Single dose | | Exudate, ml. | Percent change from controls |
| --- | --- | --- | --- | --- |
| | μMoles | μg. | | |
| Control | | | 14.3±2.20 | |
| 6α,9α-difluoroprednisolone: | | | | |
| 17-butyrate 21-acetate | 0.01 | 5.09 | 5.8±0.81 | −59.4 |
| | 0.1 | 50.9 | 4.9±1.02 | −65.7 |
| 17-butyrate 21-isobutyrate | 0.01 | 5.37 | 6.6±1.00 | −53.8 |
| | 0.1 | 53.7 | 5.7±1.14 | −60.1 |
| Betamethasone: | | | | |
| 17-butyrate 21-acetate | 0.01 | 5.05 | 10.9±1.27 | −23.7 |
| | 0.1 | 50.5 | 11.9±2.82 | −16.8 |
| 17-butyrate 21-isobutyrate | 0.01 | 5.33 | 12.4±1.72 | −13.2 |
| | 0.1 | 53.3 | 12.0±1.70 | −16.0 |

The results reported in Table II show that the 17-butyrate 21-ester of 6α,9α-difluoroprednisolone is a potent inhibitor of exudate formation while the corresponding diester of betamethasone is unable to produce the same effect even at a dose 10 times higher.

The systemic anti-inflammatory activity of the 17,21-diesters of this invention was determined using the following biological assays:

(c) Carrageenin induced paw edema assay.—This test was performed following the technique described by C. A. Winter et al. in Proc. Soc. Exp. Biol. Med. 111, 544–547; 1962. Male rats weighing approximately 150 g. were used and the test steroids were given subcutaneously in a suspending vehicle. Immediately afterward, each rat was hydrated with 3 ml. H₂O p.o. and one hour later, a 1% carrageenin solution was injected into the sole of hind paw of the rat. Three hours later, the differences between the treated and non-treated paw were measured and recorded. 17 - butyrate 21 - acetate of 6α,9α - difluoroprednisolone showed significant anti-edema activity and was found to be at least 15 times more active than betamethosone 17-valerate.

(d) Agar granuloma assay.—This test was performed according to the method of Cresseri and Meli (Arch-Sci. Biol. 37, 551; 1953), using Wistar rats of both sexes weighing about 50 g. In the cranial zone of the animals' dorsum a small 5% agar cylinder (diameter and height: 5 mm.) was implanted subcutaneously. 24 hours later, the test steroid was daily injected subcutaneously in 0.2 ml. of sesame oil solution. The control rats received the vehicle alone. On the 6th day after the treatment the animals were sacrificed and the granuloma was removed and weighed. The degree of granuloma inhibition reflects the systemic potency of the test steroid.

The results reported in Table III show that the 17-butyrate 21-esters of 6α,9α-difluoroprednisolone strongly reduce the capsule value, while the corresponding 17-butyrate 21-esters of betamethasone induce only a moderate reduction versus controls at a dose 10 times higher. The calculation of the relative potencies indicates that the 17-butyrate 21-esters of this invention have systemic activity from 30 to 50 times superior to that of the corresponding betamethosone analogs.

TABLE III

Agar granuloma (Assays Nos. 2892 and 3123)

| Compound (0.2 ml./oil) | Daily dose μMoles | Daily dose Mg. | Granuloma (mg.) |
|---|---|---|---|
| Control | | | 62.8±4.2 |
| 6α,9α-difluoroprednisolone: | | | |
| 17-butyrate 21-acetate | 0.05 | 0.02545 | 37.7±3.6 |
|  | 0.5 | 0.2545 | 13.9±0.7 |
| 17-butyrate 21-propionate | 0.05 | 0.02615 | 26.9±3.9 |
|  | 0.5 | 0.2615 | 13.4±0.8 |
| 17-butyrate 21-butyrate | 0.05 | 0.02685 | 18.9±2.1 |
|  | 0.5 | 0.2685 | 13.3±0.7 |
| 17-butyrate 21-isobutyrate | 0.05 | 0.02685 | 21.3±1.2 |
|  | 0.5 | 0.2685 | 13.9±0.7 |
| Betamethasone: | | | |
| 17-butyrate 21-acetate | 0.05 | 0.02525 | 67.3±2.9 |
|  | 0.5 | 0.2525 | 54.2±4.0 |
| 17-butyrate 21-propionate | 0.05 | 0.02595 | 59.9±4.1 |
|  | 0.5 | 0.2595 | 56.9±3.5 |
| 17-butyrate 21-butyrate | 0.05 | 0.02665 | 59.6±6.1 |
|  | 0.5 | 0.2665 | 52.7±5.3 |
| 17-butyrate 21-isobutyrate | 0.05 | 0.02665 | 57.1±3.4 |
|  | 0.5 | 0.2665 | 49.2±4.4 |

Thus, on theb asis of the results of four of the most widely employed biological assays, the 17-butyrate 21-esters of 6α,9α-difluoroprednisolone have been found to possess topical activity from 2 to 10 times higher and systemic activity from 15 to 50 times greater than that of corresponding 17-monoesters and 17,21-diesters of betamethasone.

EXAMPLE 5

An ointment having the following composition is prepared for external use following accepted pharmaceutical compounding procedures:

| Components: | Percent (%) by weight |
|---|---|
| 6,9,-difluoroprednisolone 17 - butyrate 21-acetate | 0.025 |
| Beeswax | 5.000 |
| Anhydrous lanolin | 5.000 |
| White soft paraffin | 20.000 |
| Amphocerin K (Dehydage, Deutsche Hydrierwerke) | 25.000 |
| Liquid paraffin | 14.900 |
| Distilled water | 30.075 |

Melt the beeswax, the lanolin, the white soft paraffin and the liquid paraffin at 70° C., add the active ingredient, then the mixture of the Amphocerin K and the water. Refine twice.

EXAMPLE 6

An ointment for external use as prepared having the following composition:

| Components: | Percent (%) by weight |
|---|---|
| 6α,9α-difluoroprednisolone 17-butyrate, 21-acetate | 0.05 |
| Cetyl alcohol | 0.50 |
| Anhydrous lanolin | 5.00 |
| Distilled water | 5.00 |
| Benzyl alcohol | 0.50 |
| Liquid paraffin | 20.00 |
| White soft paraffin | 68.95 |

Melt the cetyl and benzyl alcohols, the liquid paraffin and the white soft paraffin at 75° C., add the active ingredient, then the lanolin previously mixed with the water. Refine twice.

EXAMPLE 7

A cream for external use is prepared having the following composition:

| Components: | Percent (%) by weight |
|---|---|
| 6α,9α - difluoroprednisolone 17 - butyrate 21-acetate | 0.025 |
| Propylparaben | 0.015 |
| Methylparaben | 0.025 |
| Sodium laurylsulphate | 1.000 |
| Propylene glycol | 12.000 |
| Stearyl alcohol | 15.000 |
| White soft paraffin | 12.500 |
| Liquid paraffin | 22.500 |
| Distilled water | 36.935 |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above cream sodium laurylsulphate can be replaced by polyoxyl 40 stearate in an amount of 5% by weight.

EXAMPLE 8

A cream for external use is prepared having the following composition:

| Components: | Percent (%) by weight |
|---|---|
| 6α,9α-difluoroprednisolone 17 - butyrate 21-propionate | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylparaben | 0.050 |
| Tween 80 | 0.200 |
| Polyethylene glycol 6000 | 4.950 |
| Distilled water | 63.130 |

Melt the cetostearyl alcohol, the white soft paraffin, the liquid paraffin and the isopropyl stearate at about 70° C., add a solution of the active ingredient in the propylene glycol, then the other ingredients previously mixed with the water and warmed to 70° C. Refine twice.

EXAMPLE 9

An ointment for external use is prepared having the following composition:

| Components: | Percent (%) by weight |
|---|---|
| 6α,9α - difluoroprednisolone 17 - butyrate 21-acetate | 0.1 |
| Pure cholesterol | 3.0 |
| Stearyl alcohol | 8.0 |
| White soft paraffin | 51.0 |
| Liquid paraffin | 37.9 |

Add the active product to the other ingredients, previously melted at 75° C. and stir the mixture until it congeals.

EXAMPLE 10

An ointment for external use is prepared having the following composition:

| Components: | Percent (%) by weight |
|---|---|
| 6α,9α-difluoroprednisolone 17-butyrate 21-propionate | 0.10 |
| Lanolin | 14.45 |
| Liquid paraffin | 17.75 |
| Neomycin sulphate | 0.40 |
| White soft paraffin | 67.30 |

Add the 6α,9α-difluoroprednisolone 17-butyrate, 21-propionate and the neomycin sulphate to the other ingredients previously melted at 75° C. and refine twice. In place or besides the neomycin sulphate, other topically active antibiotics can be used, such as colistin sulphate, bacitracin, gramicidin, chloramphenicol or the sulphonamides.

EXAMPLE 11

An ophthalmic ointment is prepared having the following composition:

| Components: | Percent (%) by weight |
|---|---|
| 6α,9α-difluoroprednisolone 17-butyrate 21-acetate | 0.025 |
| Liquid paraffin | 29.975 |
| White soft paraffin | 70.000 |

Add the active product to the other ingredients, previously sterilized by heating at 120° C. for an hour. Refine twice and distribute into sterile tubes.

EXAMPLE 12

An ointment for external use is prepared having the following composition:

| Components: | Percent (%) by weight |
|---|---|
| 6α,9α-difluoroprednisolone 17-butyrate, 21-acetate | 0.025 |
| Pure cholesterol | 3.000 |
| Stearyl alcohol | 8.000 |
| White soft paraffin | 51.075 |
| Liquid paraffin | 37.900 |

Prepared as described in Example 9.

EXAMPLE 13

An ointment for external use is prepared having the following composition:

| Components: | Percent (%) by weight |
|---|---|
| 6α,9α-difluoroprednisolone 17-butyrate, 21-propionate | 0.025 |
| Lanolin | 14.450 |
| Liquid paraffin | 17.750 |
| Neomycin sulphate | 0.400 |
| White soft paraffin | 67.375 |

Prepared as described in Example 10.

EXAMPLE 14

Lotion having the following composition:

| Components: | Percent (%) by weight |
|---|---|
| 6α,9α-difluoroprednisolone 17-butyrate, 21-acetate | 0.03 |
| Ethyl alcohol 95° | 50.00 |
| Propylene glycol | 20.00 |
| Distilled water | 29.97 |

Dissolve the active product in the alcohol and add to a clear mixture of the other ingredients.

EXAMPLE 15

Lotion having the following composition:

| Components: | Percent (%) by weight |
|---|---|
| 6α,9α-difluoroprednisolone 17-butyrate, 21-propionate | 0.05 |
| Ethyl alcohol 95° | 40.00 |
| Glycerol | 10.00 |
| Propylene glycol | 30.00 |
| Distilled water | 19.95 |

Prepared as described in Example 14.

EXAMPLE 16

Hydrophilic ointment having the following composition:

| Components: | Percent (%) by weight |
|---|---|
| 6α,9α-difluoroprednisolone 17-butyrate, 21-propionate | 0.025 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water to 100%. | |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above hydrophilic ointment sodium laurylsulphate can be replaced by polyoxyl 40 stearate in an amount of 5% by weight.

EXAMPLE 17

Tablets for oral use having the following composition:

| | Mg. |
|---|---|
| 6α,9α-difluoroprednisolone 17-butyrate,21-acetate | 2.000 |
| Lactose spray dried | 97.500 |
| Calcium stearate | 0.500 |

Pass the lactose spray dried through a No 60 B.S. mesh sieve. Dissolve the active ingredient in about 0.03 cc. of ethyl alcohol 95°. Add the clear solution to the sieved lactose, mix well and let the solvent evaporate at room temperature in the usual manner. Add the calcium stearate to the dried mass, mix again and compress into tablets on 6 mm. diameter bisected punches.

EXAMPLE 18

Tablets having the following composition:

| | Mg. |
|---|---|
| 6α,9α-difluoroprednisolone 17-butyrate, 21-acetate | 0.2 |
| Lactose spray dried | 99.3 |
| Calcium stearate | 0.5 |

Prepared as in Example 17. Calcium stearate may be replaced by magnesium stearate.

EXAMPLE 19

An oral composition was prepared from the following components:

| | Mg. |
|---|---|
| 6α,9α-difluoroprednisolone 17-butyrate,21-acetate | 4 |
| Placebo granules | 130 |
| Magnesium stearate | 16 |

The placebo granules were made of 80% lactose and 20% rich starch. The active ingredient and magnesium stearate were added, screened, mixed with filled into hard gelatin capsules.

EXAMPLE 20

Parenteral aqueous suspension having the following composition:

| | Mg. |
|---|---|
| 6α,9α-difluoroprednisolone 17-butyrate,21-acetate | 5 |
| Polyethylene glycol 400, U.S.P. | 20 |
| Polysorbate 80, U.S.P. | 8 |
| Water for injection, U.S.P., to 1 ml. | |

EXAMPLE 21

An oil solution for parenteral use containing 0.05% by weight of 6α,9α-difluoroprednisoolne 17-butyrate,21-acetate was prepared by dissolving 0.5 g. of the active ingredient in one liter sesame oil and transferring the solution to suitable sized sterile vials under aseptic conditions.

In the same manner, the 17-butyrate,21-acetate was dissolved in 500 cc. mixture (1:1) of sesame oil and olive oil and the limpid solution filled into 0.2 cc. soft gelatin capsules for oral use, so that each capsule contains exactly 0.2 mg. of 6α,9α-difluoroprednisolone 17-butyrate 21-acetate.

It is understood that in each of the formulations illustrated by the Examples 5 to 21 the active ingredient may be replaced with other active diesters (17,21-dibutyrate or 17-butyrate,21-isobutyrate) used in accordance with this invention.

We claim:

1. A pharmaceutical composition for use in the treatment of inflammation comprising a steroid compound of the formula:

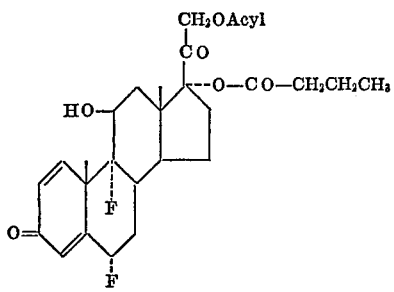

wherein Acyl is a member of the group consisting of acetyl, propionyl and isobutyryl, in association with a pharmaceutical carrier.

2. A composition as claimed in claim 1 containing from 0.0005 to 5 percent by weight of said steroid.

3. A composition as claimed in claim 1 containing from about 0.001 to about 0.25 percent by weight of said steroid.

4. A pharmaceutical composition as claimed in claim 2 for use in the systemic treatment of inflammation, wherein the steroid compound is used in association with a systemic pharmaceutical carrier.

5. A composition as claimed in claim 4 in which said steroid is 6α,9α-difluoroprednisolone 17-butyrate,21-acetate.

6. A pharmaceutical composition as claimed in claim 2, for use in the topical treatment of inflammation, wherein the steroid compound is used in association with a topical pharmaceutical carrier.

7. A composition as claimed in claim 6 in which said steroid is 6α,9α-difluoroprednisolone 17-butyrate,21-acetate.

8. A method of treating inflammatory conditions which comprises administering an effective amount of a steroid selected from the group consisting of 17-butyrate 21-acetate, 17-butyrate 21-propionate, and 17-butyrate 21-isobutyrate of 6α,9α-difluoroprednisolone incorporated in a pharmaceutical carrier.

9. A method as claimed in claim 8 wherein from 0.0005% to 5% by weight of said steroid is used.

10. A method as claimed in claim 8 wherein from 0.001% to 0.25% by weight of said steroid is used.

11. A method as claimed in claim 9 wherein a systemic pharmaceutical carrier is used.

12. A method as claimed in claim 11 in which said steroid is 6α,9α-difluoroprednisolone 17-butyrate,21-acetate.

13. A method as claimed in claim 9 wherein a topical pharmaceutical carrier is used.

14. A method as claimed in claim 13 in which said steroid is 6α,9α-difluoroprednisolone 17 butyrate,21-acetate.

References Cited
UNITED STATES PATENTS

| | | | |
|---|---|---|---|
| 2,838,499 | 6/1958 | Spero et al. | 260—239.55 |
| 3,147,249 | 9/1964 | Ercoli et al. | 260—239.55 |
| 3,152,154 | 10/1964 | Ercoli et al. | 260—397.45 |
| 3,297,729 | 1/1967 | Mancini et al. | 260—397.45 |
| 3,312,590 | 4/1967 | Elks et al. | 424—243 |
| 3,312,591 | 4/1967 | Elks et al. | 424—243 X |
| 3,376,193 | 4/1968 | Elks et al. | 424—243 |
| 3,383,394 | 5/1968 | Webber et al. | 260—397.45 |

SHEP K. ROSE, Primary Examiner

U.S. Cl. X.R.

260—397.45